United States Patent [19]

Bouche

[11] Patent Number: 5,163,627
[45] Date of Patent: Nov. 17, 1992

[54] PROCESS FOR THE TREATMENT OF WASTE SUBSTANCES FOR THE PURPOSES OF RECOVERING ORGANIC MATTER, AND DEVICE FOR ITS IMPLEMENTATION

[75] Inventor: Marcel B. Bouche, Montpellier, France

[73] Assignee: Sovadec, Grignan, France

[21] Appl. No.: 601,402

[22] Filed: Oct. 23, 1990

[30] Foreign Application Priority Data

Oct. 27, 1989 [FR] France ................. 89 14615

[51] Int. Cl.$^5$ ............................................. B65B 69/00
[52] U.S. Cl. .......................................... 241/23; 241/24; 241/74; 241/79.1; 414/412
[58] Field of Search ............... 241/23, 24, 74, 65, 241/79.1, 193, 60; 414/412

[56] References Cited

U.S. PATENT DOCUMENTS

| | | |
|---|---|---|
| 3,599,788 | 8/1971 | Fyfe . |
| 3,817,458 | 6/1974 | Gilberto ...................... 241/24 X |
| 3,848,813 | 11/1974 | Stanczyk et al. ............ 241/24 X |
| 4,009,834 | 3/1977 | Hahn et al. .................. 241/74 X |
| 4,182,592 | 1/1980 | Henryson ..................... 414/412 |
| 4,279,558 | 7/1981 | Lavoie ......................... 414/412 |
| 4,634,060 | 1/1987 | Riemann et al. ............. 241/74 |
| 4,824,028 | 4/1989 | Rota ............................ 241/74 X |
| 4,844,351 | 7/1989 | Holloway ..................... 241/24 X |
| 4,947,906 | 8/1990 | Schroeder .................... 241/193 X |

FOREIGN PATENT DOCUMENTS

| | | | |
|---|---|---|---|
| 172976 | 3/1986 | European Pat. Off. ............ 414/412 |
| 0170301 | 5/1986 | European Pat. Off. . | |
| 2517487 | 10/1976 | Fed. Rep. of Germany . | |
| 0008621 | 6/1979 | Fed. Rep. of Germany . | |
| 1300408 | 12/1962 | France . | |
| 2345230 | 10/1977 | France . | |
| 1004204 | 3/1983 | U.S.S.R. ........................... 414/412 |
| 1330021 | 8/1987 | U.S.S.R. ........................... 414/412 |

Primary Examiner—Mark Rosenbaum
Assistant Examiner—Frances Chin
Attorney, Agent, or Firm—Oliff & Berridge

[57] ABSTRACT

A process and device for the treatment of waste substances for the purposes of recovering organic matter involving introducing, by a suitable mechanical device, the substrate of waste substances to be treated; opening, by thermal fusion, any various packages containing this substrate; separating the fine elements of this substrate by screening; selectively fragmenting the coarse residues from the first sizing; separating these residues by screening; separating all of the screened fragments by means of magnetic sorting; differentially wetting these screened fragments; sorting these fragments by differential rebound and aqueous adherence; and removing, by a mechanical device, the substrate of screened waste substances.

22 Claims, 3 Drawing Sheets

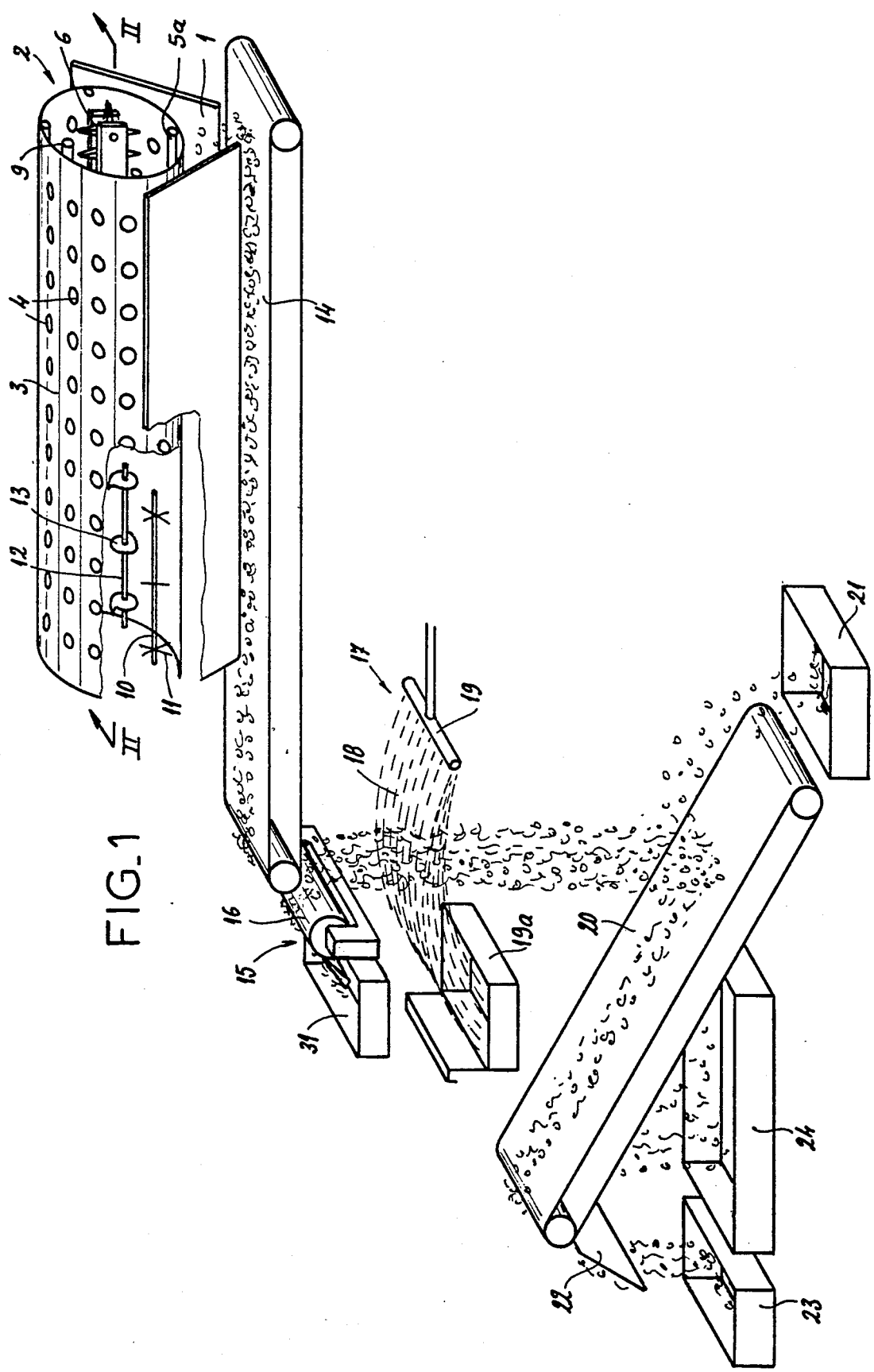
FIG_1

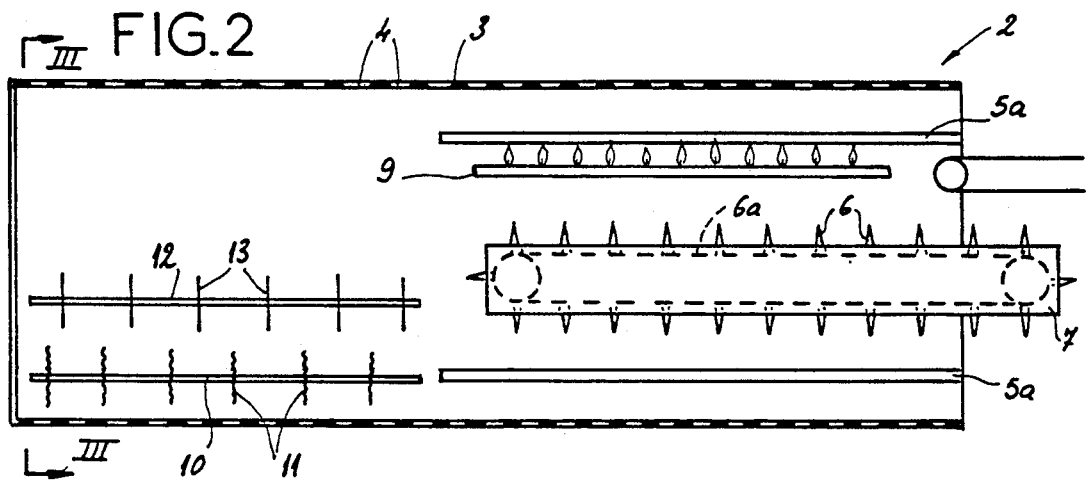
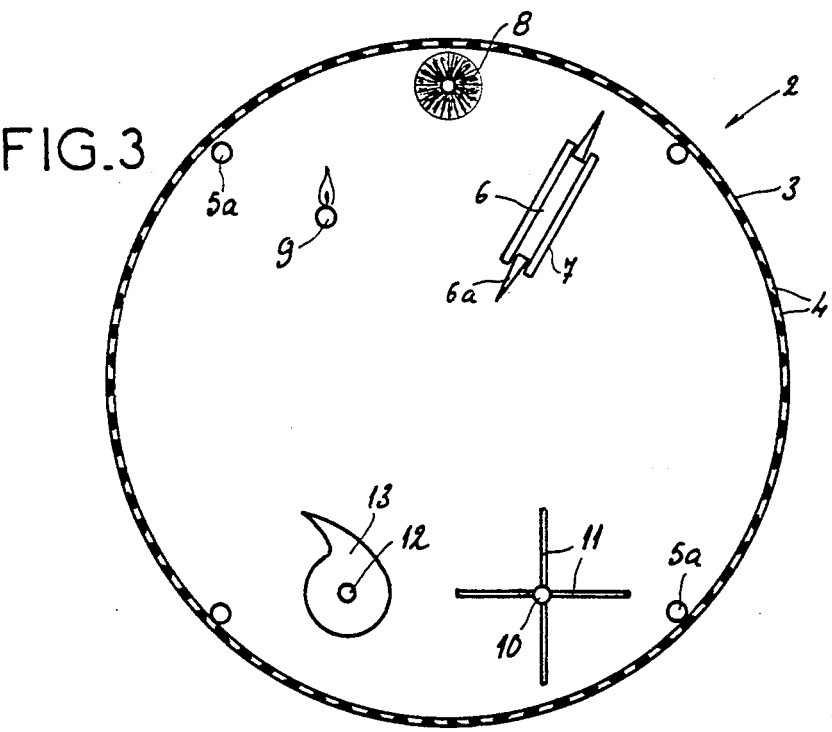
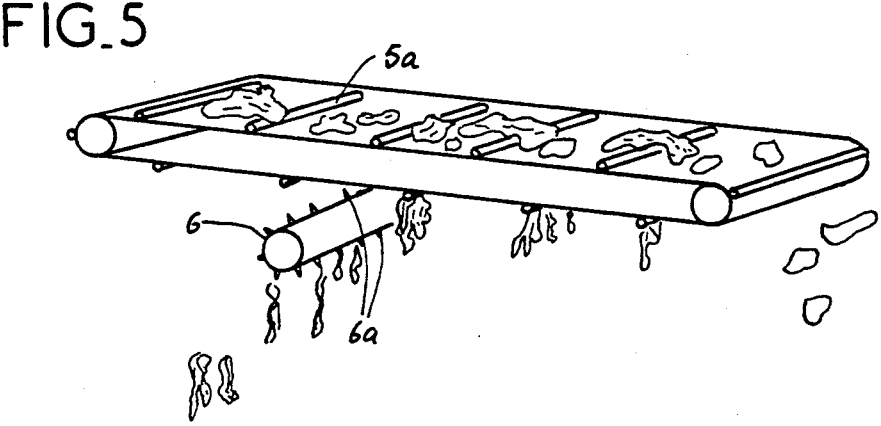

PROCESS FOR THE TREATMENT OF WASTE SUBSTANCES FOR THE PURPOSES OF RECOVERING ORGANIC MATTER, AND DEVICE FOR ITS IMPLEMENTATION

BACKGROUND OF THE INVENTION

The present invention relates to a process for the treatment of waste substances for the purposes of recovering organic matter, and to a device for its implementation.

Waste substances are understood to mean any part of material originating from domestic or industrial use and discarded as being unusable or unfit for consumption.

DESCRIPTION OF THE PRIOR ART

Various processes for the treatment of these waste substances are known at present.

These waste substances can either be dumped directly, or after undergoing a breaking-up and/or composting pre-treatment, which on the one hand poses a pollution problem, in particular of the ground-water tables and, on the other hand, considerably damages the beauty of the natural environment of the site where this dump is situated, or they can be incinerated in an incineration plant suitable for the treatment of such waste substances.

However, this latter solution results in the production of combustion residues, in the form of very pulverulent flue ashes, in relatively great quantities, which risk polluting the ground-water tables of the sites where they are kept as a result of the nature of the chemical compounds which they contain, such as highly toxic heavy metals.

Finally, these waste substances are sometimes used for the production of methane or if appropriate are composted or lumbricid-composted in the case of waste substances consisting of organic matter.

Now, in order to be able to use the lumbricids for carrying out a lumbricid-composting, that is to say a synergic action of degradation and aeration by the microorganisms and by the lumbricids or earthworms, it is necessary to have a waste substance substrate which does not contain any undesirable or parasitic elements such as, for example, glass or ground synthetic materials.

The techniques currently used for the treatment of waste substances generally have recourse to very complex devices which consume very large amounts of energy and which comprise different breaking means, such as blades, teeth, bars and the like, and which, in the case of heterogeneous waste substances, are unable to permit selection of the products which can really be used and a suitable sizing of these products in such a way as to permit their subsequent treatment by composting or lumbricid-composting, particularly by avoiding the pulverization of glass.

SUMMARY OF THE INVENTION

The present invention aims to overcome these disadvantages by providing a process for the treatment of waste substances and a device for its implementation, which permit an elimination of the undesirable waste substances, a sizing of the useful waste substances, and an optimal wetting of these waste substances, while at the same time being simple to carry out and easy to implement.

To this end, this process for the treatment of waste substances consists:
- in introducing, by suitable mechanical means, the substrate of waste substances to be treated;
- in opening, by thermal fusion, the various packages containing this substrate;
- in separating the fine elements of this substrate by screening;
- in selectively fragmenting the coarse residues from the first sizing;
- in separating these residues by screening;
- in separating all of the screened fragments by means of magnetic sorting;
- in differentially wetting these screened fragments;
- in sorting these fragments by means of differential rebound and aqueous adherence;
- in removing, by mechanical means, the substrate of screened waste substances.

This provides for a process in which a sorting of the various waste substances capable of being composted or lumbricid-composted is carried out.

Moreover, these waste substances, by virtue of the breaking-up they undergo, have a dimension suitable for a subsequent treatment, this increasing the yield of this treatment.

Finally, the selective wetting phase of this process permits a uniform distribution to be achieved up to a desired wetting threshold of this substrate of waste substances to be lumbricid-composted, thereby avoiding any unpleasant phenomenon of anerobic fermentation.

By virtue of the use of mechanical means adapted for the introduction and removal of these waste substances, this process can function in a continuous manner, with and according to a variable flow-rate, depending on the nature of the waste substances to be treated.

According to the preferred embodiment, the process consists:
- in introducing, by suitable mechanical means, the substrate of waste substances to be treated at the inlet end of a rotating drum,
- in opening, by thermal fusion, the various packages containing this substrate,
- in separating the fine elements of this substrate by screening,
- in selectively fragmenting the coarse residues from the first sizing,
- in separating these residues by screening,
- in separating all of the screened fragments by means of magnetic sorting,
- in differentially wetting these screened fragments,
- in sorting these fragments by means of differential rebound and aqueous adherence,
- in removing, by mechanical means, the substrate of screened waste substances, at the outlet end of the rotating drum.

According to a simple embodiment of the invention, a device for the implementation of this process comprises, in combination, a hopper inside which there is arranged a rotating drum both of whose inlet and outlet ends are open and whose wall comprises a plurality of orifices arranged uniformly along generatrices of this drum, mechanical means for introducing the packages containing the substrate of waste substances to be treated, heating means arranged at the upstream end of the rotating drum in such a way as to permit the opening of the packages by thermal fusion, mechanical fragmentation means arranged at the downstream end of the drum, means for separating the waste substances and means for differential wetting arranged under the outlet end of the drum, and means for removing these treated waste substances.

According to one characteristic of the invention, the means for introducing the substrate of waste substances to be treated into the drum consist of a band conveyor, one of whose ends is situated facing the inlet orifice of the rotating drum.

This type of conveyor is particularly suitable since, depending on the control of its throughput, it facilitates the introduction of the substrate of waste substances in a continuous manner.

Advantageously, the means for removing the treated waste substances consist of a band conveyor situated under the base of the rotating drum, and one of whose ends is placed above the differential wetting means.

This type of conveyor permits control of the removal of the substrate of treated waste substances in phase with that corresponding to their introduction into the rotating drum.

According to one embodiment of the invention, the walls of the drum comprise a plurality of orifices uniformly spaced and arranged along the generatrices of this drum and whose dimension and shape are such that they permit a sizing of the substrate of waste substances to be treated.

According to a first embodiment of the device, the mechanical heating means consist of tubes fixed to the inner surface of the upstream part of the drum, along generatrices of this drum which are offset from those where orifices are arranged, each of these tubes comprising electrically resistive elements.

According to another embodiment of the device, the mechanical heating means consist of tubes in which a heat-transfer fluid circulates.

Whatever the method of the supply of heat energy, the form, nature and number of the heating elements can vary depending on the nature of the packages to be opened.

In order to obtain temperatures within the thermal range of that of glass transition of the synthetic material, that is to say that at which this synthetic material loses its consistency and its rigidity and softens and is converted into fragments, an electronic regulating device is provided.

Advantageously, these heating elements make it possible to carry out a first selection of the waste substances to be treated, insofar as all the synthetic materials contained in the waste substances and situated near these heating elements will undergo the same thermal treatment.

In order to avoid the adherence of these synthetic materials on the heating elements, an endless chain, provided with teeth, is placed in a casing of suitable profile in the upstream part of the drum parallel to the heating elements, so as to permit the pick-up of these fragments and their conveying outside the drum, in such a way that they do not fall onto the mechanical means for conveying the treated and sized waste substances.

According to one characteristic of the invention, a brush placed in the upstream part of the drum makes it possible to clear any fragments of synthetic material which might not have been picked up.

According to another characteristic of the invention, a burner, whose temperature is made suitable, is arranged at the upstream end of the drum in such a way as to destroy the fragments of synthetic material.

According to an alternative embodiment, the heating elements are arranged uniformly on the outer surface of the drum along generatrices of this drum, this drum moving in rotation with respect to the packages which advance in translation on a suitable mechanical means outside this drum.

According to one embodiment of the invention, the mechanical means for breaking up light matter, affording the greatest density while at the same time having a large contact surface, consist of at least two rotating shafts situated in the downstream part of the rotating drum, one carrying collecting whips uniformly spaced along its entire length, the other, placed with respect to the first one in such a way that it avoids any contact with this first shaft, carrying projecting blades uniformly arranged along its entire length.

This breaking-up aims to permit a reduction in the size of the waste substances, of light materials of considerable size, in such a way as to permit their emergence via the graded orifices in the wall of the drum, while at the same time ensuring a selection of the different waste substances to be treated.

To this end, the whips laterally attack the heterogeneous materials and for this reason they permit a differential conveying of the light materials having a large contact surface.

In order to permit a better separation of the light materials from the heaviest materials to be broken up, the shaft on which the whips are fixed has a rotational speed which is different from that of the shaft on which the blades are fixed.

Advantageously, the relative distance between each whip and each blade occupying a zig-zag arrangement is such that it allows a graded breaking-up of the materials in such a way as to permit their subsequent emergence via the corresponding orifices arranged in the wall of the drum.

According to another advantageous characteristic of the invention, the whips are made of a flexible and elastic material.

Advantageously, this flexible and elastic material is a twisted steel wire.

According to one alternative embodiment, the end of each whip is provided with a terminal mallet.

The terminal mallet on each whip makes it possible to modify the kinetic energy gathered by the rotation of this whip, and for this reason increases its ability to pick up the waste substances of greater or lesser lightness.

Moreover, it makes it possible to maintain the integrity of the components of the steel wires, thereby avoiding any phenomenon of unraveling.

It should be noted that it is also possible to arrange, uniformly spaced along the entire length of the whips, mallets made from the same material as that cited above.

According to one alternative embodiment, the whips have a length increasing from the end nearest the heating elements to that facing the outlet opening of the rotating drum.

This type of whips permits a differential attack on the different light waste substances to be treated, as a function of the movement past of the heterogenous materials, the shortest whips producing only a superficial effect.

According to one characteristic of the invention, mechanical means for magnetic sorting, situated at the end of the band conveyor which conveys the treated and sized waste substances, permit retention of any metallic particles which are undesirable for the subsequent operation of lumbricid-composting.

According to another characteristic of the invention, a differential wetting device, situated under the magnetic sorting device, permits wetting of the sized waste substances, in the form of particles, by the intersection of the rectilinear trajectory of these particles falling under the action of gravity with the cone of the liquid flow emitted, at an angle and with a parabolic trajectory, by a nozzle.

This type of differential wetting device makes it possible to obtain a wetting which is well distributed and which is suited to the subsequent operations of treatment of the organic matter.

Moreover, the use of the kinetic energy of the particles of liquid makes it possible to obtain a deviation of the particles of waste substances as a function of the density of the materials, this promoting their subsequent selection.

According to another characteristic of the invention, mechanical receiving and removing means, consisting of a conveyor belt inclined at an angle to the vertical, receive the particles in such a way as to permit the selective rebound of the heaviest of these particles, following the same angle downstream, while the particles which are lightest, and which have a greater wetting surface, adhere to this belt and are conveyed towards the upstream end of the latter.

Advantageously, a separator consisting of a bent plate permits a better separation of the treated waste substances, as a function of the various fractions adhering to a greater or lesser extent to the surface of the conveyor belt.

At any rate, the invention will be fully understood from the following description in which reference is made to the attached diagrammatic drawing showing, by way of non-limiting examples, several embodiments of the device for the implementation of the process for the treatment of waste substances.

BRIEF DESCRIPTION OF THE DRAWINGS

FIG. 1 is a general view of a device;

FIG. 2 is a longitudinal cutaway view thereof along the line II—II in FIG. 1;

FIG. 3 is a transverse cutaway view thereof along the line III—III in FIG. 2;

FIG. 5 is a view of a band conveyor and the mechanical scraping means according to the alternative embodiment for opening the packages;

FIGS. 1 to 3 show, seen from different angles, the device for the treatment of the waste substances according to the invention.

DESCRIPTION OF THE PREFERRED EMBODIMENTS

Figure 4:
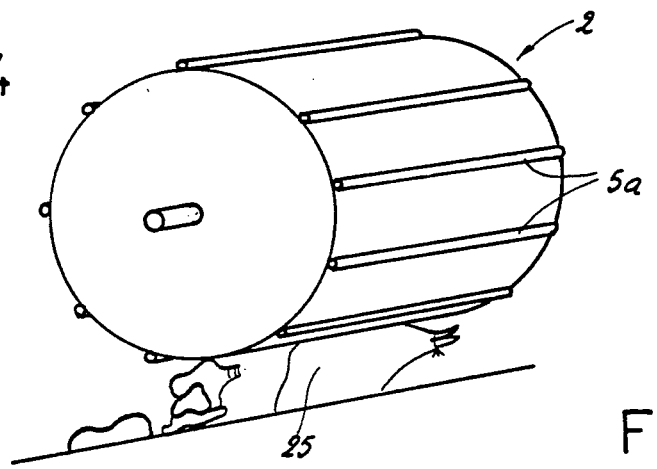
FIG. 4 is a view of an alternative embodiment of the device for opening the packages by thermal fusion.
Figure 7:
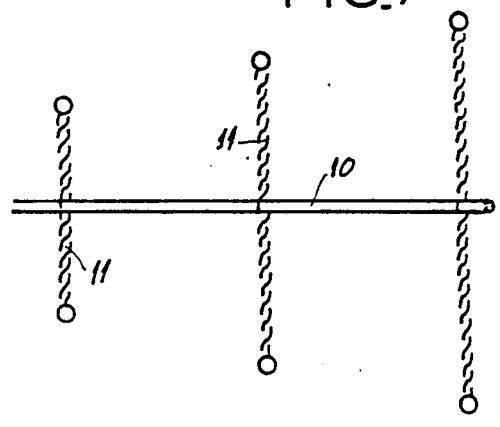
FIGS. 6 and 7 show alternative embodiments of the whips.

This device for the implementation of the process according to the invention comprises an incurved hopper 1 inside which there is a rotating drum 2 actuated by suitable mechanical means (not shown in these figures) whose inlet and outlet ends are open, and whose peripheral wall 3 comprises a plurality of orifices 4 arranged uniformly along generatrices.

Arranged along generatrices offset from those in which the orifices 4 are arranged in the wall of the rotating drum 2, four heating elements 5a, as shown more clearly in FIG. 3, are fixed in the upstream part on the inner face of the rotating drum in such a way as to permit the opening, by thermal fusion, of the packages made of synthetic material and containing the waste substances to be treated.

As shown more clearly in FIGS. 2 and 3, a chain 6, arranged in the upstream part of the drum, and placed in a casing 7 of suitable profile, comprises teeth 6a in such a way as to permit the pick-up of the fragments of synthetic material which remain adhered on the heating elements 5a and to move them towards the outside of the rotating drum in such a way as to prevent their being mixed with the treated and sized waste substances.

As shown in FIGS. 2 and 3, a brush 8, placed in the upstream part of the rotating drum 2, is arranged in such a way as to prevent any contact with the heating elements 5, and makes it possible to clear the various fragments of synthetic material which are adhering on the heating elements 5a.

A burner 9, as shown more particularly in FIGS. 2 and 3, is placed in the upstream part of the rotating drum 2 in such a way as to burn any fragments of synthetic material which are not picked up by the chain 6. This burner 9 is designed in a known manner and is arranged in such a way as to prevent any contact with the heating elements 5a and the brush 8.

Figure 8:
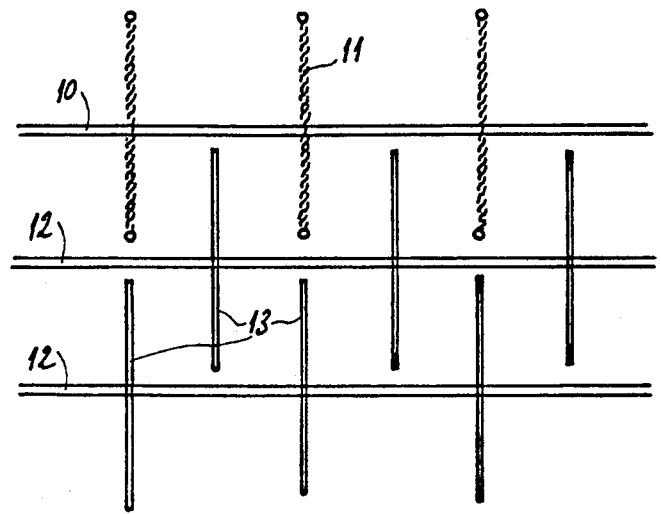
FIG. 8 is a diagrammatic view of the relative position of the shafts bearing the whips and of the shafts bearing the blades.

In the upstream part of the rotating drum 2, a rotating shaft 10, actuated by mechanical means (not shown) comprises whips 11 uniformly arranged along its entire length, in such a way as to permit a heterogeneous attack of the light materials. Arranged parallel to this first rotating shaft 10, a second rotating shaft 12, actuated by mechanical means (not shown in these figures), bears blades 13 uniformly arranged along its entire length and arranged in a zig-zag relative to the whips 11, as shown more clearly in FIG. 8. The distance between these whips and the blades 13 is such that it permits a sizing of the waste substances, ensuring their subsequent passage through the orifices formed in the wall of the rotating drum 2.

A band conveyor 14 placed under the base of the hopper 1 recovers the sized fragments of waste substances. This conveyor 14 has a path which is such that its end is situated beyond the downstream end of the rotating drum 2 in such a way as to permit the removal of the sorted and sized waste substances. Under the end of this conveyor 14, a device for magnetic sorting 15, consisting of a roller 16 made of ferromagnetic substance, makes it possible to recover the various metallic fragments contained in the sized substrate. These waste substances are then recovered in a container 31 by suitable mechanical means (not shown in FIG. 1).

Under the device for magnetic sorting 15, a differential wetting device 17 permits a homogeneous wetting of the particles up to a suitable wetting threshold by virtue of the intersection of the cone of fluid 18 emitted by the nozzle 19 and the volume of the substrate of treated and sized waste substances, in the form of particles, falling in a rectilinear trajectory under the action of gravity. A displaceable container 19a is situated at a distance suitable for recovering the excess liquid.

Finally, under the differential wetting device 17, a conveyor belt 20, inclined at an angle to the vertical, receives the lightest particles which will adhere to the surface and will be conveyed towards its upstream end, while the heaviest particles rebound selectively at the same angle and are recovered in the tray 21.

A bent metallic plate, constituting a separator 22, makes it possible to separate the particles according to their adherence to the surface of the belt 20. A tray 23 is arranged in such a way as to recover the most strongly adhering fraction under the belt 20, while another tray 24 downstream of the separator recovers the less adhering particles.

FIG. 4 shows an alternative embodiment of the device for opening the packages by thermal fusion, in which the heating elements 5a are arranged uniformly along generatrices of the rotating drum 2 over its entire length. These heating elements 5a are fixed on the outer wall of this rotating drum 2 in such a way as to permit the opening of the packages 25 by means of thermal fusion upon contact with these packages 25, which are moved by suitable mechanical means outside this drum.

The packages opened in this way are conveyed by a band conveyor, as shown more clearly in FIG. 5. The heavy substrates fall at the end of this conveyor, while the lightest fragments remain adhering on longitudinal bars which are uniformly arranged on this conveyor. These fragments are then scraped off at one of the ends of the conveyor by a chain 6 comprising teeth 6a in such a way as to pick the fragments up.

Figure 6:
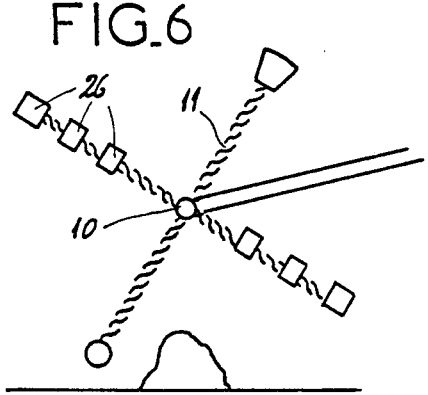

FIG. 6 shows a particular embodiment of the whips 11 made of a flexible material, whose ends are terminated by mallets 26 of various shapes, such as square, round or frustoconical.

In the case where the mallets 26 are of square configuration, three of them are arranged uniformly over the entire length of the whip 11 in such a way as to modify the kinetic energy of these whips and in this way to increase their ability to pick up the waste substances.

FIG. 6 shows an alternative embodiment in which the size of the whips 11 increases from one end to the other of the shaft bearing them. This configuration is particularly well suited since it permits a differential attack on the various light elements to be treated, the shortest whips producing only a superficial effect.

The process for the treatment of waste substances proceeds as described hereinbelow.

Introduction in a continuous manner, or if appropriate at a pre-established rhythm, of heterogeneous waste substances which may or may not be in packages made of plastic material at the upstream end of a rotating drum 2, whose walls 3 comprise uniformly spaced orifices 4 of suitable diameter. This introduction is carried out by suitable mechanical means (not shown in the figures). The packages are opened by the heating bars of 5 tubes by the phenomenon of thermal fusion, resulting in this way in an initial selection of the plastic materials which they comprise, since some of these undergo the same heat treatment. All these plastic materials, in fragmented form, are picked up by a chain and are removed to the outside or burned by a burner inside the rotating drum.

The waste substances of a sufficient size (fine elements) pass, by means of screening, through the orifices 4 in the wall 3 of the rotating drum 2, leaving behind coarse residues. The coarse residues are then fragmented by blades 13 arranged on rotating shafts 12 and are homogenized by whips 11 carried by other rotating shafts 10 parallel to the abovementioned first ones 12, the blades 13 being arranged in zig-zag formation relative to the whips 11. The relative distance between these blades 13 and these whips 11 is such that it permits fragmentation of the coarse residues suitable for separation by the orifices 4 of the rotating drum 2, the fragmented coarse residues being thus combined with the separated fine elements to form a screened material.

The sized and sorted waste substances are conveyed by a band conveyor under the base of the hopper as far as one of its ends, where they are subjected to magnetic sorting.

Having undergone this sorting, where the metallic particles are withdrawn, the particles of sized waste substances fall by gravity and are moistened by a differential wetting device 17. At the outlet of this wetting device 17, they are deflected by the kinetic energy of the droplets upon their contact with the droplets of liquid and are subjected to sorting by differential rebound or adhesion on a band conveyor 20 inclined at an angle to the horizontal. The heaviest particles rebound at the same angles, while the lightest particles and those offering the greatest surface of adhesion are conveyed towards the end of this conveyor before being separated by a separator 22 as a function of their ability to remain adhering to the surface of this conveyor 20.

It goes without saying that the invention is not limited to the single embodiment of the process for the treatment of waste substances and the device for its implementation which have been described hereinabove by way of non-limiting example, and that on the contrary it encompasses all alternative embodiments and applications while respecting the same principle.

Thus, the scope of the invention will not be departed from by modifying the shape of the hopper, the size of the orifices, the number, shape and distribution of the heating elements, or the shafts comprising the whips and the blades, or the device for magnetic sorting used.

I claim:

1. A process for the treatment of waste substances, comprising the steps of:
    introducing by mechanical means a substrate of waste substances to be treated into a rotating drum;
    opening any plastic packages containing the substrate by thermal fusion from direct contact with heating tubes disposed in said drum,
    separating fine elements of the substrate by screening,
    selectively fragmenting coarse residues remaining after separating the fine elements, and
    separating the fragmented coarse residues by screening and combining screened fragmented coarse residues with the screened fine elements to form a screened material.

2. The process as claimed in claim 1, wherein:
    in the introducing step, the substrate of waste substances to be treated is introduced at an inlet end of the rotating drum, and further comprising the steps of
    removing the screened material by mechanical means below the rotating drum,
    separating magnetic materials from the screened material by magnetic sorting,
    differentially wetting the magnetically screened material which has been magnetically sorted, and
    sorting the differentially wetted screened material by differential rebound and aqueous adherence.

3. A device for the treatment of waste substances, comprising:

a hopper inside which there is arranged a rotating drum, said drum comprising open inlet and outlet ends and a wall having a plurality of orifices therethrough arranged uniformly along generatrices of the drum, mechanical means for introducing into said drum any plastic packages containing a substrate of waste substances to be treated, heating means comprising heating tubes arranged at an upstream end of the rotating drum for opening said any packages by thermal fusion through direct contact between the plastic packages and the heating tubes, mechanical fragmentation means arranged at a downstream end of the drum, means for simultaneously removing waste substances from said drum while said heating means opens the packages.

4. The device as claimed in claim 3, in which the means for introducing packages comprises a band conveyor having an end situated facing the inlet opening of the rotating drum.

5. The device as claimed in claim 3, in which the means for removing waste substances from the drum comprises a band conveyor situated under the rotating drum, the band conveyor having an end above the differential wetting means.

6. The device as claimed in claim 3, in which the orifices in the drum wall are uniformly spaced and arranged along the generatrices of the drum and have a dimension and shape for the selective sizing of the substrate of waste substances to be treated.

7. The device as claimed in claim 3, in which the heating tubes are fixed to an inner surface of an upstream side of the drum along generatrices of the drum offset from the generatrices where the orifices are arranged, each of said tubes comprising electrically resistive elements.

8. The device as claimed in claim 3, in which the heating tubes have heat-transfer fluid circulating therein.

9. The device as claimed in claim 3, further comprising an endless chain provided with teeth inside a casing in an upstream part of the drum parallel to the heating means, so as to selectively pick-up and convey waste fragments to the outside of the drum such that the waste fragments do not fall onto the means for removing waste substances.

10. The device as claimed in claim 9 further comprising a brush in the upstream part of the drum for clearing any fragments not picked up by the endless chain.

11. The device as claimed in claim 3, further comprising a burner arranged at the upstream end of the drum for destroying fragments of synthetic material in the substrate of waste substances.

12. The device as claimed in claim 3, in which the heating tubes are arranged uniformly on the outer surface of the drum along generatrices of the drum, the drum having a rotating means for moving the drum in rotation with respect to the packages which advance in translation by said means for introducing.

13. The device as claimed in claim 3, in which the mechanical fragmentation means comprises at least two rotating shafts situated in a downstream part of the rotating drum, a first said shaft carrying collecting whips uniformly spaced along its entire length, a second said shaft, placed with respect to the first shaft in such a way that it avoids any contact with the first shaft, carrying projecting blades uniformly along its entire length.

14. The device as claimed in claim 13, in which the whips and blades form a zig-zag arrangement and have a relative distance therebetween to provide a graded breaking-up of the waste substances for the subsequent passage of waste substances through corresponding orifices arranged in the wall of the drum 15. The device as claimed in claim 13, in which the whips are made of a flexible and elastic material.

16. The device as claimed in claim 15, in which the flexible and elastic material is a twisted steel wire.

17. The device as claimed in claim 13, in which the end of each whip is provided with a terminal mallet.

18. The device as claimed in claim 13, in which the whips have a length increasing from an end of the first shaft nearest the heating elements to an opposite end facing the outlet opening of the rotating drum.

19. The device as claimed in claim 3, further comprising means for separating the waste substances which comprise a means for magnetic sorting situated at the end of the means for removing waste substances, and a magnetic sorting means retaining metallic particles which are undesirable for a subsequent operation of lumbricid-composting.

20. The device as claimed in claim 3, further comprising means for differential wetting situated under the magnetic sorting device which permits wetting of the waste substances, in the form of particles, by the intersection of a rectilinear trajectory of these particles falling under the action of gravity with a cone of a liquid flow emitted, at an angle and with a parabolic trajectory, by a nozzle.

21. The device as claimed in claim 3, further comprising a means for sorting, comprising a conveyor belt inclined at an angle to the vertical for receiving waste substances in the form of particles of different weights such that the heaviest of these particles rebound downstream, while the lightest particles having a greater wetting surface, adhere to the belt and are conveyed by the belt towards the upstream end of the sorting means.

22. The device as claimed in claim 21, further comprising a separator comprising a bent plate for separation of said lightest particles, as a function of the adherence of said lightest particles to the surface of the conveyor belt.

* * * * *